ically

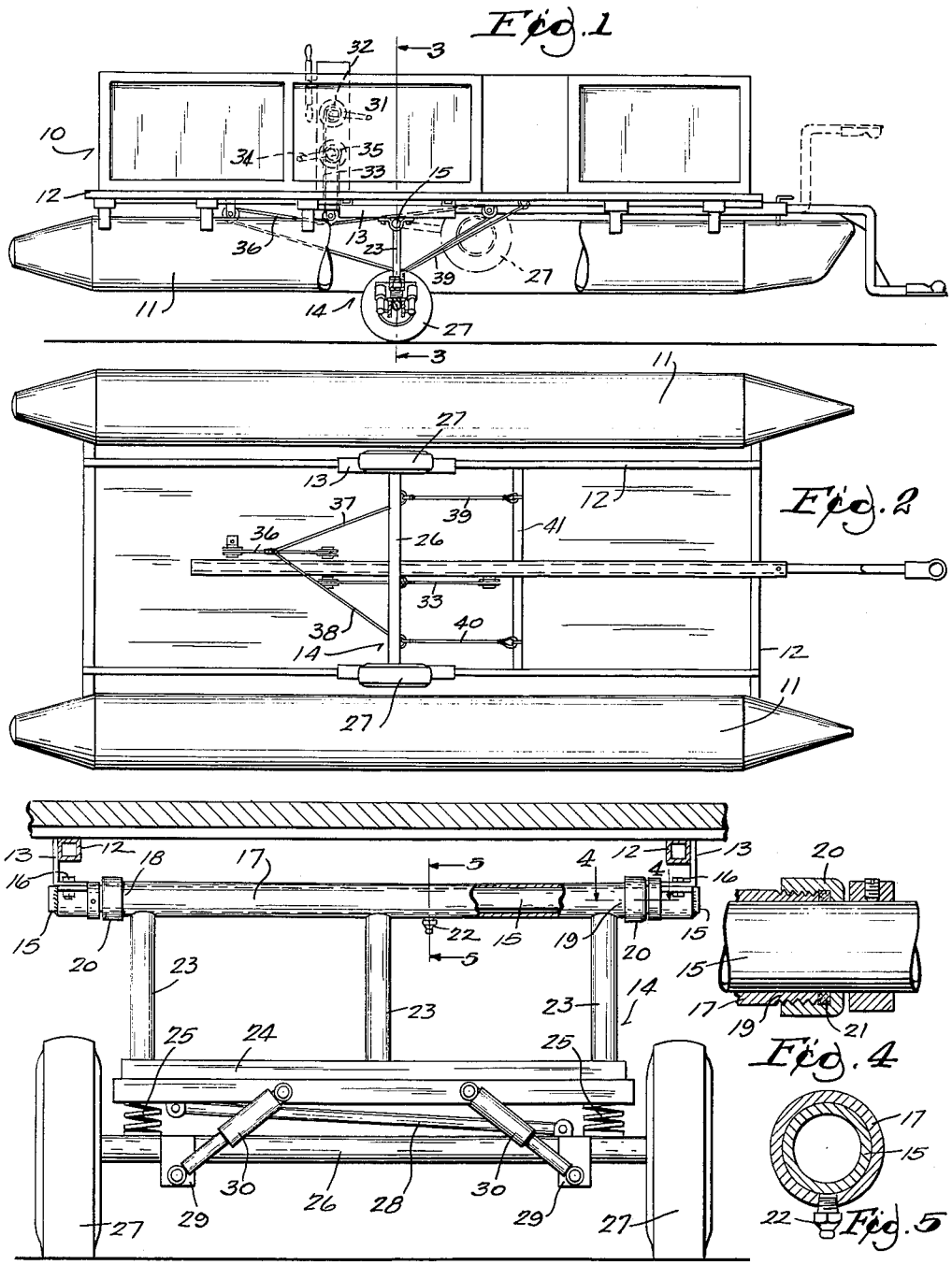

United States Patent Office 3,203,014
Patented Aug. 31, 1965

3,203,014
TRAILER EQUIPPED PONTOON YACHT
Clifford H. Krueger, 849 N. Glenview Ave., Apt. 2, Wauwatosa, Wis.
Filed Oct. 16, 1963, Ser. No. 316,725
1 Claim. (Cl. 9—1)

This invention relates to improvements in trailer equipped pontoon yachts, and more particularly to a novel trailer equipped pontoon yacht provided with trailer wheels of the retractable type.

An object of the invention is to provide a device of the type having a trailer wheel mounting which will combat rust formation usually a problem in developments of the type.

Another object of the invention is to provide an adjustable tow pole which may be varied in length.

Other and further objects of the invention will appear as the description proceeds, reference being had to the accompanying drawing, in which:

FIG. 1 is a side view of a pontoon yacht with one pontoon partially broken away to show the trailer wheel mounting embodying the invention.

FIG. 2 is an inverted plan view of the same.

FIG. 3 is a view partly in section and partly in elevation taken on line 3—3 of FIG. 1.

FIG. 4 is a view taken on line 4—4 of FIG. 3.

FIG. 5 is a view taken on line 5—5 of FIG. 3.

Referring more particularly to the drawings, the numeral 10 refers to a pontoon yacht having the pontoons 11 and the frame 12 provided with the depending brackets 13 for the retractable wheel assembly 14. A shaft 15 is bolted by means 16 to the brackets 13 affixed to and depending from frame 12. A hollow shaft 17 embraces the shaft 15 freely to permit introduction and retention of lubricant therebetween. The ends 18 and 19 of hollow shaft 17 are threaded to receive the collar caps 20, each of which contains a gasket 21 which will act to retain lubricant introduced thru the fitting 22.

The hollow shaft 17 has integral therewith the standards 23 which in turn are secured to the cross member 24 from which depend a pair of coil springs 25 fixed to axle 26 for the ground bearing wheels 27. A stabilizr rod 28 connects the cross member 24 with the axle 26. The brackets 29 connect axle 26 with the cross member 24 by means of two pairs of shock absorbers 30, one pair disposed fore and the other aft of the cross member 24.

In use, a crank 31 and windlass 32 are used to pull a relatively light cable 33 for raising the wheel assmbly 14 to retracted position, as illustrated in broken lines in FIG. 1.

A crank 34 and windlass 35 are used to pull the assembly 14, by means of cable 36 joined with cables 37 and 38, to the operable or vertical position against the pull of the twin cables 39 and 40, affixed to member 41 of the frame 12.

It will be understood that the device is capable of many modifications in structure and design, without departing from the spirit of the invention, within the scope of the appended claim.

Having thus described in invention, what is claimed and desired to be secured by Letters Patent of the United States, is:

A pontoon yacht, a pair of elongated parallel pontoons for supporting the same in the water, frame members attached adjacent the top of said pontoons and spacing the same, a horizontal shaft fixed to said frame members at right angles to and aligned with the tops of said pontoons, a hollow shaft freely embracing said fixed shaft, a wheel assembly attached to said hollow shaft, means for retracting the same, exterior threads on both ends of said hollow shaft, lubricant retentive gaskets abutting the ends of said hollow shaft, a grease cup in said hollow shaft for introducing lubricant between the hollow and the fixed shafts, and an apertured internally threaded element for each end of the hollow tube, said element having a reduced portion for contact with the fixed shaft, and an internal shoulder in said element to back the lubricant retentive gasket.

References Cited by the Examiner
UNITED STATES PATENTS

| | | | |
|---|---|---|---|
| 1,891,517 | 12/32 | Williams | 280—150.5 |
| 1,991,491 | 2/35 | Calkins et al. | 308—120 |
| 2,705,649 | 4/55 | Collier | 280—504 |
| 2,759,201 | 8/56 | McKinney | 9—1 |
| 2,835,510 | 5/58 | Schoneberg | 280—504 |
| 3,052,202 | 9/62 | Dearborn | 9—1 X |
| 3,067,439 | 12/62 | Brush | 9—1 |
| 3,135,975 | 6/64 | Andranigian | 9—1 |

MILTON BUCHLER, *Primary Examiner.*
FERGUS S. MIDDLETON, *Examiner.*